US012729286B2

(12) United States Patent
Iwasaki et al.

(10) Patent No.: US 12,729,286 B2
(45) Date of Patent: Sep. 8, 2026

(54) CRYSTAL NUCLEATING AGENT COMPOSITION FOR POLYOLEFIN RESIN, AND POLYOLEFIN RESIN COMPOSITION INCLUDING SAID CRYSTAL NUCLEATING AGENT COMPOSITION

(71) Applicant: NEW JAPAN CHEMICAL CO., LTD., Kyoto (JP)

(72) Inventors: Shohei Iwasaki, Kyoto (JP); Kazuya Matsumoto, Kyoto (JP); Ryuto Yachi, Kyoto (JP); Ken-Ichi Miyazaki, Kyoto (JP)

(73) Assignee: NEW JAPAN CHEMICAL CO., LTD., Kyoto (JP)

( * ) Notice: Subject to any disclaimer, the term of this patent is extended or adjusted under 35 U.S.C. 154(b) by 774 days.

(21) Appl. No.: 17/802,585

(22) PCT Filed: Mar. 4, 2021

(86) PCT No.: PCT/JP2021/008324
§ 371 (c)(1),
(2) Date: Aug. 26, 2022

(87) PCT Pub. No.: WO2021/177386
PCT Pub. Date: Sep. 10, 2021

(65) Prior Publication Data

US 2023/0183451 A1 Jun. 15, 2023

(30) Foreign Application Priority Data

Mar. 6, 2020 (JP) ................................ 2020-038353

(51) Int. Cl.
*C08K 5/527* (2006.01)
*C08K 5/098* (2006.01)
*C08L 23/12* (2006.01)

(52) U.S. Cl.
CPC .............. *C08K 5/527* (2013.01); *C08K 5/098* (2013.01); *C08L 23/12* (2013.01); *C08L 2203/30* (2013.01); *C08L 2205/24* (2013.01)

(58) Field of Classification Search
CPC ...... C08K 5/527; C08K 5/098; C08K 5/0083; C08L 23/12; C08L 2203/30; C08L 2205/24
See application file for complete search history.

(56) References Cited

U.S. PATENT DOCUMENTS 3,207,737 A 9/1965 Wales et al.
3,207,739 A 9/1965 Wales et al.
(Continued)

FOREIGN PATENT DOCUMENTS

CN 102027060 A 4/2011
CN 102532701 A 7/2012
(Continued)

OTHER PUBLICATIONS

Office Action dated Aug. 31, 2023, issued in counterpart CN application No. 202180017887.3, with English translation. (14 pages).

(Continued)

*Primary Examiner* — Robert S Jones, Jr.
*Assistant Examiner* — Joshua Caleb Bledsoe
(74) *Attorney, Agent, or Firm* — WHDA, LLP

(57) ABSTRACT

The disclosure relates to a crystal nucleating agent composition including a compound represented by formula (1) and a compound represented by formula (2).

(1)

$R^1$ is a $C_1$-$C_4$ alkyl group, $R^1$ binds to the carbon at position 3 or 4 of a cyclohexane ring. When $M_1$ is a calcium ion or a hydroxyaluminum ion, a is 2, and b is 1, and when $M_1$ is a sodium ion or a lithium ion, a is 1, and b is 2.

(2)

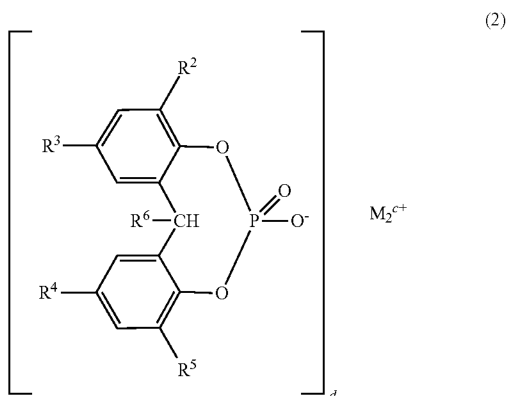

$R^2$ to $R^5$ are the same or different, and each represents a hydrogen atom or a $C_1$-$C_9$ alkyl group, $R^6$ is a hydrogen atom or a $C_1$-$C_3$ alkyl group. When $M_2$ is an alkali metal ion, c is 1, and d is 1, and when $M_2$ is an alkaline earth metal ion, a zine ion, or a hydroxyaluminum ion, c is 2, and d is 2.

10 Claims, No Drawings

(56) References Cited

U.S. PATENT DOCUMENTS

| | | | | |
|---|---|---|---|---|
| 2003/0027908 | A1 | 2/2003 | Dotson et al. | |
| 2003/0027909 | A1 | 2/2003 | Dotson | |
| 2003/0149150 | A1 | 8/2003 | Dotson et al. | |
| 2003/0236329 | A1 | 12/2003 | Kawamoto et al. | |
| 2004/0132884 | A1 | 7/2004 | Dotson et al. | |
| 2004/0220311 | A1 | 11/2004 | Dotson et al. | |
| 2010/0317779 | A1 | 12/2010 | Pham et al. | |
| 2011/0105657 | A1 | 5/2011 | Tanji et al. | |
| 2014/0288217 | A1 | 9/2014 | Hatanaka et al. | |
| 2020/0325150 | A1 | 10/2020 | Iwasaki et al. | |
| 2023/0219972 | A1 | 7/2023 | Iwasaki et al. | |
| 2024/0254314 | A1 * | 8/2024 | Tsai | C08J 3/20 |

FOREIGN PATENT DOCUMENTS

| | | | |
|---|---|---|---|
| CN | 103880627 | A | 6/2014 |
| CN | 104761815 | A | 7/2015 |
| CN | 109503937 | A | 3/2019 |
| CN | 109563308 | A | 4/2019 |
| CN | 109776954 | A | 5/2019 |
| JP | H07-173342 | A | 7/1995 |
| JP | 2002-338820 | A | 11/2002 |
| JP | 2004-83852 | A | 3/2004 |
| JP | 2004-524417 | A | 8/2004 |
| JP | 2004-525227 | A | 8/2004 |
| JP | 2011-42706 | A | 3/2011 |
| JP | 2012-97268 | A | 5/2012 |
| TW | 201331348 | A | 8/2013 |
| WO | 2002/078924 | A2 | 10/2002 |
| WO | 2002/079312 | A1 | 10/2002 |
| WO | 2002/094759 | A1 | 11/2002 |
| WO | 2005/040259 | A1 | 5/2005 |
| WO | 2018/031271 | A1 | 2/2018 |
| WO | 2020/054492 | A1 | 3/2020 |

OTHER PUBLICATIONS

Beck et al., “Heterogeneous Nucleating Agents for Polypropylene Crystallization”, Journal of Applied Polymer Science, 1967, vol. 11, pp. 673-685, (13 pages).

Binsbergen, “Heterogeneous nucleation in the crystallization of polyolefins: Part 1. Chemical and physical nature of hucleating agents”, Polymer, 1970, vol. 11(5), pp. 253-267, (15 pages).

International Search Report dated Apr. 13, 2021, issued in counterpart International Application No. PCT/JP2021/008324 (2 pages).

* cited by examiner

CRYSTAL NUCLEATING AGENT COMPOSITION FOR POLYOLEFIN RESIN, AND POLYOLEFIN RESIN COMPOSITION INCLUDING SAID CRYSTAL NUCLEATING AGENT COMPOSITION

TECHNICAL FIELD

The present invention relates to a crystal nucleating agent composition for polyolefin resins, a polyolefin resin composition comprising the crystal nucleating agent composition, and a polyolefin resin molded article obtained by using the resin composition as a raw material.

BACKGROUND ART

Polyolefin resins, such as polyethylene and polypropylene, are inexpensive and have well-balanced performance, and are thus used as general-purpose plastics in a variety of applications. In general, in terms of crystalline resins, an improvement in the crystallinity is widely known to be able to improve, for example, molding processability, as well as mechanical properties, thermal properties, and optical properties of the resulting molded products. The same applies to polyolefin resins.

As a method of improving the crystallinity of resins, a method of controlling the structure and composition of a resin has been widely studied and put into practical use. As a simpler and more practical method, a method of blending additives has been widely used. Crystal nucleating agents are typical additives that can improve the crystallinity of resins, and various studies on them have been conducted so far. Crystal nucleating agents of inorganic compounds, such as talc, and crystal nucleating agents of organic compounds, such as diacetal compounds, metal salts of phosphoric acid esters, and metal salts of carboxylic acids and sulfonic acids, have been studied for various crystalline resins and put into practical use.

Among the above crystal nucleating agents, it has long been known that metal salts of carboxylic acids have an excellent nucleating agent effect. Typical examples include a sodium salt of benzoic acid and a hydroxyaluminum salt of p-tert-butylbenzoic acid, which have been widely used in various applications (Patent Literature (PTL) 1 and 2 and Non-patent Literature (NPL) 1 and 2).

Recently, metal salts (e.g., calcium salt and sodium salt) of alicyclic carboxylic acids, such as hexahydrophthalic acid and hydrogenated nadic acid, have been reported to have excellent effects as crystal nucleating agents for thermoplastic resins (PTL 3 to PTL 7).

Among the above crystal nucleating agents, a metal salt of phosphoric acid ester, when blended with a resin to produce a molded product, is known to achieve excellent improvement in mechanical properties, in particular, rigidity of the molded product; thus, metal salts of phosphoric acid esters are widely used in the fields of automotive materials, industrial materials, etc. (PTL 8 and PTL 9).

In PTL 10, the flexural modulus and crystallization temperature of polymer compositions containing a metal salt of 2,2'-methylene-bis(4,6-di-tert-butylphenyl)phosphate anion, a metal salt of cis-hexahydrophthalate anion, and a polymer are evaluated.

In recent years, plastics have been coming to be used in various applications for the purpose of reducing costs, weight, etc. In particular, a polyolefin resin, which is inexpensive and light-weight, is attracting attention as the most useful material. The use of polyolefin resins is most prevalent for automotive components since there is a strong demand for lower fuel consumption due to recent environmental issues; polyolefin resins have been recently coming to be used not only in small components but also in large components. In such fields, improvement of the crystallinity with the use of a known crystal nucleating agent is not necessarily sufficient in terms of improving molding processability and mechanical properties, and further improvement of crystallinity is desired.

CITATION LIST

Patent Literature

PTL 1: U.S. Pat. No. 3,207,737
PTL 2: U.S. Pat. No. 3,207,739
PTL 3: WO2002/078924 (JP2004-525227A)
PTL 4: WO2002/079312 (JP2004-524417A)
PTL 5: WO2002/094759 (JP2004-531613A)
PTL 6: WO2005/040259 (JP2007-509196A)
PTL 7: JP2012-97268A
PTL 8: JP2002-338820A
PTL 9: JP2004-83852A
PTL 10: WO2018/031271 (JP2019-532120A)

Non-Patent Literature

NPL 1: J. Appl. Poly. Sci., 11, 673-685 (1967)
NPL 2: Polymer, 11 (5), 253-267 (1970)

SUMMARY OF INVENTION

Technical Problem

An object of the present invention is to provide a crystal nucleating agent composition for polyolefin resins, the composition having an absolutely excellent crystallinity-improving effect (crystallization-promoting effect), which is essential performance of a crystal nucleating agent for polyolefin resins. Specifically, an object of the present invention is to provide a crystal nucleating agent composition for polyolefin resins capable of improving the crystallization rate and crystallization temperature of a polyolefin resin when blended with the polyolefin resin, while also improving the rigidity of the resulting molded articles.

Another object of the present invention is to provide a polyolefin resin composition comprising the crystal nucleating agent composition, and provide a polyolefin resin molded article obtained by using the resin composition as a raw material.

Solution to Problem

To achieve the above objects, the present inventors conducted extensive study and consequently found that a crystal nucleating agent composition for polyolefin resins comprising a metal salt of an alicyclic dicarboxylic acid having a specific structure and a metal salt of a phosphoric acid ester having a specific structure is capable of remarkably improving the crystallization rate and crystallization temperature of a polyolefin resin when blended with the polyolefin resin, while also greatly improving the rigidity of the resulting molded articles. The present invention has thus been accomplished.

More specifically, the present invention relates to the following crystal nucleating agent composition for polyolefin resins, polyolefin resin composition comprising the crystal nucleating agent composition, and polyolefin resin molded article obtained by using the resin composition as a raw material.

[1] A crystal nucleating agent composition for polyolefin resins, the composition comprising a compound represented by the following formula (1) (a metal salt of an alicyclic dicarboxylic acid) and a compound represented by the following formula (2) (a metal salt of a phosphoric acid ester):

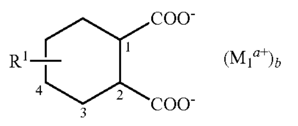

(1)

wherein $R^1$ is a $C_1$-$C_4$ alkyl group, $R^1$ binds to the carbon at position 3 or 4 of a cyclohexane ring, and $M_1$ is a calcium ion, a hydroxyaluminum ion, a sodium ion, or a lithium ion, and when $M_1$ is a calcium ion or a hydroxyaluminum ion, a is 2, and b is 1, and when $M_1$ is a sodium ion or a lithium ion, a is 1, and b is 2; and

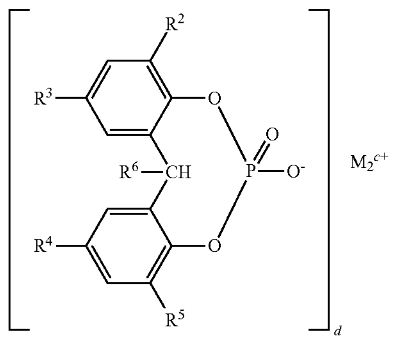

(2)

wherein $R^2$ to $R^5$ are the same or different, and each represents a hydrogen atom or a $C_1$-$C_9$ alkyl group, $R^6$ is a hydrogen atom or a $C_1$-$C_3$ alkyl group, and $M_2$ is an alkali metal ion, an alkaline earth metal ion, a zinc ion, or a hydroxyaluminum ion, and when $M_2$ is an alkali metal ion, c is 1, and dis 1, and when $M_2$ is an alkaline earth metal ion, a zinc ion, or a hydroxyaluminum ion, c is 2, and d is 2.

[2] The crystal nucleating agent composition for polyolefin resins according to Item [1], wherein the mass ratio of the compound represented by formula (1) to the compound represented by formula (2) is 5/95 to 95/5.

[3] The crystal nucleating agent composition for polyolefin resins according to Item [1] or [2], wherein in the compound represented by formula (1), the content of an isomer in which $R^1$ and two oxycarbonyl groups on the cyclohexane ring all have a cis configuration is 70 mol % or more of total stereoisomers.

[4] The crystal nucleating agent composition for polyolefin resins according to any one of Items [1] to [3], wherein $R^1$ is a methyl group or a tert-butyl group.

[5] A polyolefin resin composition comprising the crystal nucleating agent composition for polyolefin resins of any one of Items [1] to [4] and a polyolefin resin.

[6] A polyolefin resin composition according to Item [5], comprising the crystal nucleating agent composition for polyolefin resins in an amount of 0.001 to 10 parts by mass per 100 parts by mass of the polyolefin resin.

[7] A polyolefin resin molded article comprising the polyolefin resin composition of Item [5] or [6].

[8] A method for producing the crystal nucleating agent composition for polyolefin resins of any one of Items [1] to [4], the method comprising mixing the compound represented by formula (1) and the compound represented by formula (2).

[9] A method for producing the polyolefin resin composition of Item [5] or [6], the method comprising mixing the compound represented by formula (1) and the compound represented by formula (2) to obtain a crystal nucleating agent composition for polyolefin resins, and blending the obtained crystal nucleating agent composition with a polyolefin resin.

Advantageous Effects of Invention

The crystal nucleating agent composition of the present invention when blended with a polyolefin resin is capable of remarkably improving the crystallization rate and crystallization temperature of the polyolefin resin. That is, the half-crystallization time of the polyolefin resin can be shortened, and the crystallization temperature can be increased. Additionally, the crystal nucleating agent composition of the present invention when blended with a polyolefin resin is capable of remarkably improving the rigidity of the resulting molded products. That is, the flexural modulus of the polyolefin resin can be improved.

As a result, the molding cycle, in particular, for large components etc., can be greatly shortened, which is very effective, for example, in reducing costs and preventing problems during processing. Furthermore, since the rigidity of the resulting molded products improves, various effects can be achieved, such as weight reduction by making the product thinner. In particular, the molded products are useful in the fields of automotive materials and industrial materials. Furthermore, the crystal nucleating agent composition of the present invention can achieve excellent effects even when used in combination with a filler, such as talc, and a neutralizing agent, such as calcium stearate, without reducing the effects. Accordingly, the crystal nucleating agent composition of the present invention can be used in various applications.

DESCRIPTION OF EMBODIMENTS

1. Crystal Nucleating Agent Composition for Polyolefin Resins

The crystal nucleating agent composition for polyolefin resins of the present invention is characterized by comprising a compound represented by formula (1) (a metal salt of an alicyclic dicarboxylic acid) and a compound represented by formula (2) (a metal salt of a phosphoric acid ester).

Metal Salt of Alicyclic Dicarboxylic Acid Represented by Formula (1)

(1)

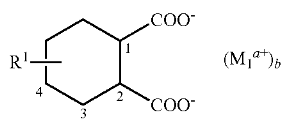

In the formula, $R^1$ is a $C_1$-$C_4$ alkyl group, $R^1$ binds to the carbon at position 3 or 4 of a cyclohexane ring, and $M_1$ is a calcium ion, a hydroxyaluminum ion, a sodium ion, or a lithium ion, and when $M_1$ is a calcium ion or a hydroxyaluminum ion, a is 2, and b is 1, and when $M_1$ is a sodium ion or a lithium ion, a is 1, and b is 2.

The metal salts of alicyclic dicarboxylic acids represented by formula (1) above can be easily produced by reacting an alicyclic dicarboxylic acid represented by formula (3) below or an anhydride thereof with a metal oxide, a metal hydroxide, a metal chloride, or the like. For example, the metal salts of alicyclic dicarboxylic acids represented by formula (1) above can be produced following or according to PTL 3 to PTL 7, etc.

(3)

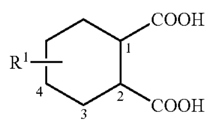

In the formula, $R^1$ is as defined above.

$R^1$ in formulas (1) and (3) is a $C_1$-$C_4$ linear or branched alkyl group. Specific examples include methyl, ethyl, n-propyl, isopropyl, n-butyl, isobutyl, sec-butyl, and tert-butyl. Among these, methyl and tert-butyl groups are particularly recommended, for example, from the viewpoint of crystallization-improving effect.

The substitution position of R in formulas (1) and (3) is position 3 or position 4 of the cyclohexane ring. Substitution at either position is possible. A particularly preferred substitution position is appropriately selected according to the type of the alkyl group as the substituent and the type of the metal species that forms a metal salt.

The metal species that forms a metal salt of an alicyclic dicarboxylic acid represented by formula (1) is one member selected from the group consisting of a calcium ion, a hydroxyaluminum ion, a sodium ion, and a lithium ion. Among these, a calcium ion, hydroxyaluminum ion, or sodium ion is more preferred from the viewpoint of a crystallinity-improving effect.

Specific embodiments of the metal salt of an alicyclic dicarboxylic acid represented by formula (1) include a disodium salt of 3-methylcyclohexane-1,2-dicarboxylic acid, a calcium salt of 3-methylcyclohexane-1,2-dicarboxylic acid, a hydroxyaluminum salt of 3-methylcyclohexane-1,2-dicarboxylic acid, a dilithium salt of 3-methylcyclohexane-1,2-dicarboxylic acid, a disodium salt of 3-ethylcyclohexane-1,2-dicarboxylic acid, a calcium salt of 3-ethylcyclohexane-1,2-dicarboxylic acid, a hydroxyaluminum salt of 3-ethylcyclohexane-1,2-dicarboxylic acid, a dilithium salt of 3-ethylcyclohexane-1,2-dicarboxylic acid, a disodium salt of 3-n-propylcyclohexane-1,2-dicarboxylic acid, a calcium salt of 3-n-propylcyclohexane-1,2-dicarboxylic acid, a hydroxyaluminum salt of 3-n-propylcyclohexane-1,2-dicarboxylic acid, a dilithium salt of 3-n-propylcyclohexane-1,2-dicarboxylic acid, a disodium salt of 3-isopropylcyclohexane-1,2-dicarboxylic acid, a calcium salt of 3-isopropylcyclohexane-1,2-dicarboxylic acid, a hydroxyaluminum salt of 3-isopropylcyclohexane-1,2-dicarboxylic acid, a dilithium salt of 3-isopropylcyclohexane-1,2-dicarboxylic acid, a disodium salt of 3-n-butylcyclohexane-1,2-dicarboxylic acid, a calcium salt of 3-n-butylcyclohexane-1,2-dicarboxylic acid, a hydroxyaluminum salt of 3-n-butylcyclohexane-1,2-dicarboxylic acid, a dilithium salt of 3-n-butylcyclohexane-1,2-dicarboxylic acid, a disodium salt of 3-tert-butylcyclohexane-1,2-dicarboxylic acid, a calcium salt of 3-tert-butylcyclohexane-1,2-dicarboxylic acid, a hydroxyaluminum salt of 3-tert-butylcyclohexane-1,2-dicarboxylic acid, a dilithium salt of 3-tert-butylcyclohexane-1,2-dicarboxylic acid, a disodium salt of 3-isobutylcyclohexane-1,2-dicarboxylic acid, a calcium salt of 3-isobutylcyclohexane-1,2-dicarboxylic acid, a hydroxyaluminum salt of 3-isobutylcyclohexane-1,2-dicarboxylic acid, a dilithium salt of 3-isobutylcyclohexane-1,2-dicarboxylic acid, a disodium salt of 4-methylcyclohexane-1,2-dicarboxylic acid, a calcium salt of 4-methylcyclohexane-1,2-dicarboxylic acid, a hydroxyaluminum salt of 4-methylcyclohexane-1,2-dicarboxylic acid, a dilithium salt of 4-methylcyclohexane-1,2-dicarboxylic acid, a disodium salt of 4-ethylcyclohexane-1,2-dicarboxylic acid, a calcium salt of 4-ethylcyclohexane-1,2-dicarboxylic acid, a hydroxyaluminum salt of 4-ethylcyclohexane-1,2-dicarboxylic acid, a dilithium salt of 4-ethylcyclohexane-1,2-dicarboxylic acid, a disodium salt of 4-n-propylcyclohexane-1,2-dicarboxylic acid, a calcium salt of 4-n-propylcyclohexane-1,2-dicarboxylic acid, a hydroxyaluminum salt of 4-n-propylcyclohexane-1,2-dicarboxylic acid, a dilithium salt of 4-n-propylcyclohexane-1,2-dicarboxylic acid, a disodium salt of 4-isopropylcyclohexane-1,2-dicarboxylic acid, a calcium salt of 4-isopropylcyclohexane-1,2-dicarboxylic acid, a hydroxyaluminum salt of 4-isopropylcyclohexane-1,2-dicarboxylic acid, a dilithium salt of 4-isopropylcyclohexane-1,2-dicarboxylic acid, a disodium salt of 4-n-butylcyclohexane-1,2-dicarboxylic acid, a calcium salt of 4-n-butylcyclohexane-1,2-dicarboxylic acid, a hydroxyaluminum salt of 4-n-butylcyclohexane-1,2-dicarboxylic acid, a dilithium salt of 4-n-butylcyclohexane-1,2-dicarboxylic acid, a disodium salt of 4-tert-butylcyclohexane-1,2-dicarboxylic acid, a calcium salt of 4-tert-butylcyclohexane-1,2-dicarboxylic acid, a hydroxyaluminum salt of 4-tert-butylcyclohexane-1,2-dicarboxylic acid, a dilithium salt of 4-tert-butylcyclohexane-1,2-dicarboxylic acid, a disodium salt of 4-isobutylcyclohexane-1,2-dicarboxylic acid, a calcium salt of 4-isobutylcyclohexane-1,2-dicarboxylic acid, a hydroxyaluminum salt of 4-isobutylcyclohexane-1,2-dicarboxylic acid, and a dilithium salt of 4-isobutylcyclohexane-1,2-dicarboxylic acid. Preferred embodiments include a disodium salt of 3-methylcyclohexane-1,2-dicarboxylic acid, a calcium salt of 4-methylcyclohexane-1,2-dicarboxylic acid, and a calcium salt of 4-tert-butylcyclohexane-1,2-dicarboxylic acid.

The metal salts of an alicyclic dicarboxylic acid represented by formula (1) may be used alone or in a combination of two or more.

The metal salts of an alicyclic dicarboxylic acid represented by formula (1) have a cis isomer in which $R^1$ and two oxycarbonyl groups on the cyclohexane ring are all oriented in the same direction with respect to the plane of paper (an isomer in which all of the groups have a cis configuration), and other stereoisomers. As long as the effects of the present invention are obtained, the present invention does not depend on the structure of the isomers. From the viewpoint of crystallinity-improving effect, it is desirable that the metal salt be rich in the cis isomer. For example, the ratio (mol %) of the cis isomer in the stereoisomers above is recommended to be 70 mol % or more, preferably 80 mol % or more, more preferably 90 mol % or more, still more preferably 95 mol % or more, and particularly 97 mol % or more.

The particle shape of the metal salt of an alicyclic dicarboxylic acid represented by formula (1) may be any shape as long as the effects of the present invention are obtained. When the metal salt of the alicyclic dicarboxylic acid is of a dispersion type, the smaller the particle size is to the extent that secondary aggregation does not deteriorate the dispersibility in the resin, the more the contact surface with the resin increases. This possibly enables the crystal nucleating agent to exert far better performance in a smaller amount. Accordingly, from the viewpoint of crystallization-promoting performance, the average particle size determined by laser diffraction particle size distribution measurement is recommended to be 100 μm or less, preferably 50 μm or less, more preferably 20 μm or less, and particularly preferably 10 μm or less. Further, from the viewpoint of dispersibility, as described above, the average particle size determined by laser diffraction particle size distribution measurement is recommended to be 0.01 μm or more, preferably 0.1 μm or more, and more preferably 0.5 μm or more.

Metal Salt of Phosphoric Acid Ester Represented by Formula (2)

(2)

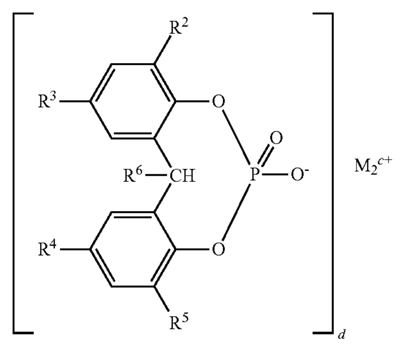

In the formula, $R^2$ to $R^5$ are the same or different, and each represents a hydrogen atom or a $C_1$-$C_9$ alkyl group, $R_6$ is a hydrogen atom or a $C_1$-$C_3$ alkyl group, and $M_2$ is an alkali metal ion, an alkaline earth metal ion, a zinc ion, or a hydroxyaluminum ion, and when $M_2$ is an alkali metal ion, c is 1, and d is 1, and when $M_2$ is an alkaline earth metal ion, a zinc ion, or a hydroxyaluminum ion, c is 2, and d is 2.

Specific embodiments of the metal salt of a phosphoric acid ester represented by formula (2) include sodium-2,2'-methylene-bis(4,6-di-methylphenyl)phosphate, sodium-2,2'-methylene-bis(4,6-di-ethylphenyl)phosphate, sodium-2,2'-methylene-bis(4,6-di-tert-butylphenyl)phosphate, sodium-2,2'-methylene-bis(4-methyl-6-tert-butylphenyl)phosphate, sodium-2,2'-methylene-bis(4-ethyl-6-tert-butylphenyl)phosphate, sodium-2,2'-ethylidene-bis(4,6-di-tert-butylphenyl)phosphate, sodium-2,2'-ethylidene-bis(4-isopropyl-6-tert-butylphenyl)phosphate, sodium-2,2'-ethylidene-bis(4-n-butyl-6-tert-butylphenyl)phosphate, sodium-2,2'-butylidene-bis(4,6-di-methylphenyl)phosphate, sodium-2,2'-butylidene-bis(4,6-di-tert-butylphenyl)phosphate, sodium-2,2'-tert-octylmethylene-bis(4,6-di-methylphenyl)phosphate, sodium-2,2'-tert-octylmethylene-bis(4,6-di-tert-butylphenyl)phosphate, lithium-2,2'-methylene-bis(4,6-di-tert-butylphenyl)phosphate, lithium-2,2'-methylene-bis(4-methyl-6-tert-butylphenyl)phosphate, lithium-2,2'-methylene-bis(4-ethyl-6-tert-butylphenyl)phosphate, lithium-2,2'-ethylidene-bis(4,6-di-tert-butylphenyl)phosphate, potassium-2,2'-ethylidene-bis(4,6-di-tert-butylphenyl)phosphate, calcium-bis[2,2'-methylene-bis(4,6-di-tert-butylphenyl)phosphate], calcium-bis[2,2'-ethylidene-bis(4,6-di-tert-butylphenyl)phosphate], magnesium-bis[2,2'-methylene-bis(4,6-di-tert-butylphenyl)phosphate], magnesium-bis[2,2'-ethylidene-bis(4,6-di-tert-butylphenyl)phosphatel, barium-bis[2,2'-methylene-bis(4,6-di-tert-butylphenyl)phosphate], barium-bis[2,2'-ethylidene-bis(4,6-di-tert-butylphenyl)phosphate], aluminum-tris[2,2'-methylene-bis(4,6-di-tert-butylphenyl)phosphate], and aluminum-tris[2,2'-ethylidene-bis(4,6-di-tert-butylphenyl)phosphate]. Among these, preferred embodiments include sodium-2,2'-methylene-bis(4,6-di-tert-butylphenyl)phosphate, and lithium-2,2'-methylene-bis(4,6-di-tert-butylphenyl)phosphate. In particular, sodium-2,2'-methylene-bis(4,6-di-tert-butylphenyl)phosphate is most recommended.

The metal salts of a phosphoric acid ester represented by formula (2) may be used alone or in a combination of two or more.

The metal salt of the phosphoric acid ester can be easily produced by using, for example, the production method described in JPS61-210090A and the like. It is also possible to use commercial products that are currently available as crystal nucleating agents for polyolefin, such as ADK STAB NA-11, ADK STAB NA-27, and ADK STAB NA-902 produced by ADEKA Corporation.

The particle shape of the metal salt of a phosphoric acid ester represented by formula (2) may be any shape as long as the effects of the present invention are obtained. When the metal salt of the phosphoric acid ester is of a dispersion type, the smaller the particle size is to the extent that secondary aggregation does not deteriorate the dispersibility in the resin, the more the contact surface with the resin increases. This possibly enables the crystal nucleating agent to exert far better performance in a smaller amount. Accordingly, from the viewpoint of crystallization-promoting performance, the average particle size determined by laser diffraction particle size distribution measurement is recommended to be 100 μm or less, preferably 50 μm or less, more preferably 20 μm or less, and particularly preferably 10 μm or less. Further, from the viewpoint of dispersibility, as described above, the average particle size determined by laser diffraction particle size distribution measurement is recommended to be 0.01 μm or more, preferably 0.1 μm or more, and more preferably 0.5 μm or more.

The ratio (mass ratio) of the compound represented by formula (1) to the compound represented by formula (2) in the crystal nucleating agent composition of the present invention may be any ratio as long as the effects of the present invention are obtained. From the viewpoint of the effects of the present invention, the ratio is preferably 5/95 to 95/5, and more preferably 10/90 to 90/10. When the ratio (mass ratio) of the compound represented by formula (1) to the compound represented by formula (2) is within the above ranges, the crystallization-promoting effect and the rigidity-improving effect on the resulting molded products, which are the characteristics of the present invention, can both be achieved at the same time.

In addition, when the ratio (mass ratio) of the compound represented by formula (1) to the compound represented by formula (2) in the crystal nucleating agent composition of the present invention is 40/60 to 60/40, a far better crystallization-promoting effect and rigidity-improving effect on molded products can be obtained due to the synergistic effect, as compared with when the compound represented by formula (1) or the compound represented by formula (2) is used alone. In particular, the effects are most remarkable when the ratio (mass ratio) of the compound represented by formula (1) to the compound represented by formula (2) is 45/55 to 55/45, and further 50/50.

The crystal nucleating agent composition of the present invention may contain various additives that are commonly used for polyolefin resins, other than the compound represented by formula (1) and the compound represented by formula (2), as long as the effects of the present invention are not impaired. In that case, the content of the compound represented by formula (1) and the compound represented by formula (2) in the crystal nucleating agent composition is recommended to be such that the total amount of the compound represented by formula (1) and the compound represented by formula (2) is 70 mass % or more, preferably 80 mass or more, more preferably 90 mass % or more, and particularly preferably 95 mass or more, based on 100 mass % of the total of the crystal nucleating agent composition.

The additives that can be incorporated in the crystal nucleating agent composition of the present invention can be selected from additives for polyolefin resins that can be added to the polyolefin resin composition described later.

The crystal nucleating agent composition of the present invention can be prepared by uniformly mixing in advance the compound represented by formula (1), the compound represented by formula (2), and optionally one or more other additives. The mixing method may be any method as long as the effects of the present invention are obtained; the mixing can be usually carried out at room temperature using a general-purpose dry powder mixer of rotary type or stirring type.

2. Polyolefin Resin Composition

The polyolefin resin composition of the present invention comprises the crystal nucleating agent composition for polyolefin resins described above (which comprises the compound represented by formula (1) and the compound represented by formula (2)) and a polyolefin resin. The polyolefin resin composition of the present invention may optionally comprise one or more other additives for polyolefin resins.

The content of the crystal nucleating agent composition for polyolefin resins in the polyolefin resin composition is not particularly limited as long as the effect as the crystal nucleating agent is obtained. The content is preferably 0.001 to 10 parts by mass, more preferably 0.01 to 5 parts by mass, per 100 parts by mass of the polyolefin resin.

The content of the compound represented by formula (1) in the polyolefin resin composition is preferably 0.001 to 10 parts by mass, and more preferably 0.01 to 5 parts by mass, per 100 parts by mass of the polyolefin resin. The content of the compound represented by formula (2) in the polyolefin resin composition is preferably 0.001 to 10 parts by mass, and more preferably 0.01 to 5 parts by mass, per 100 parts by mass of the polyolefin resin.

Polyolefin Resin

The polyolefin resin for use may be any polyolefin resin as long as the effects of the present invention are obtained, and may be a conventionally known polyolefin resin. Examples include polyethylene resins, polypropylene resins, polybutene resins, polymethylpentene resins, and polybutadiene resins. More specific examples include high-density polyethylene, medium-density polyethylene, linear polyethylene, ethylene copolymers having an ethylene content of 50 mass or more (preferably 70 mass % or more), propylene homopolymers, propylene copolymers having a propylene content of 50 mass % or more (preferably 70 mass % or more), butene homopolymers, butene copolymers having a butene content of 50 mass % or more (preferably 70 mass % or more), methylpentene homopolymers, methylpentene copolymers having a methylpentene content of 50 mass or more (preferably 70 mass or more), and polybutadiene. These copolymers may be a random copolymer or a block copolymer. Of the above resins, the resins having tacticity may be isotactic or syndiotactic. Specific examples of comonomers that can constitute the copolymers include $C_2$-$C_{12}$ $\alpha$-olefins, such as ethylene, propylene, butene, pentene, hexene, heptene, octene, nonene, decene, undecene, and dodecene; bicyclo monomers, such as 1,4-endomethylenecyclohexene; (meth)acrylic acid esters, such as methyl (meth)acrylate and ethyl (meth)acrylate; and vinyl acetate.

Examples of catalysts used for production of the polymer include commonly used Ziegler-Natta catalysts, as well as catalyst systems obtained by combining a catalyst in which a transition metal compound (e.g., titanium halides, such as titanium trichloride and titanium tetrachloride) is supported on a carrier mainly containing a magnesium halide (e.g., magnesium chloride) with an alkyl aluminum compound (e.g., triethyl aluminum, diethyl aluminum chloride). Examples of catalysts also include metallocene catalysts.

The melt flow rate (abbreviated below as "MER") of the polyolefin resin according to the present invention is a value measured in accordance with JIS K 7210-1999. The MER is appropriately selected according to the molding method used. The MER is usually recommended to be about 0.01 to 200 g/10 min, and preferably about 0.05 to 100 g/10 min.

Other Additives

As described above, the polyolefin resin composition of the present invention may comprise one or more other additives for polyolefin resins according to the intended use or its application as long as the effects of the present invention are not impaired.

Examples of the additives for polyolefin resins include various additives listed in "The Tables of Positive Lists of Additives" edited by Japan Hygienic Olefin and Styrene Plastics Association (September 2004). Specific examples include fluorescent brighteners (e.g., 2,5-thiophene diyl(5-tert-butyl-1,3-benzoxazole) and 4,4'-bis(benzoxazol-2-yl) stilbene), antioxidants, stabilizers (e.g., metal compounds, epoxy compounds, nitrogen compounds, phosphorus compounds, and sulfur compounds), ultraviolet absorbers (e.g., benzophenone compounds and benzotriazole compounds), surfactants, lubricants (e.g., aliphatic hydrocarbons, such as paraffin and wax, $C_8$-$C_{22}$ higher fatty acids, $C_8$-$C_{22}$ higher fatty acid metal (such as Al, Ca) salts, $C_8$-$C_{22}$ higher aliphatic alcohols, polyglycol, esters of $C_4$-$C_{22}$ higher fatty acids and $C_4$-$C_{18}$ aliphatic monohydric alcohols, $C_8$-$C_{22}$ higher fatty acid amides, silicone oil, and rosin derivatives), fillers (e.g., talc, hydrotalcite, mica, zeolite, perlite, diatom earth, calcium carbonate, and glass fiber), foaming agents, foaming aids, polymer additives, plasticizers (e.g., dialkylphthalate and dialkylhexahydrophthalate), crosslinking agents, crosslinking accelerators, antistatic agents, flame retardants, dispersants, organic and inorganic pigments (e.g., indigo compounds, phthalocyanine compounds, anthraquinone compounds, ultramarine compounds, and cobalt aluminate compounds), processing aids, and other nucleating agents.

The amount of these additives when used may be within a usual range as long as the effects of the present invention are not impaired. For example, the amount is commonly preferably about 0.0001 to 100 parts by mass, and more preferably about 0.001 to 50 parts by mass, per 100 parts by mass of the polyolefin resin.

Examples of the antioxidant include phenolic antioxidants, phosphorous acid ester antioxidants, and sulfur antioxidants. Specific examples of the antioxidants include phenolic antioxidants, such as 2,6-di-tert-butylphenol, tetrakis[methylene-3-(3,5-di-tert-butyl-4-hydroxyphenyl)propionate]methane, and 2-hydroxy-4-methoxybenzophenone; sulfur antioxidants, such as alkyl disulfide, thiodipropionic acid ester, and benzothiazole; and phosphorous acid ester antioxidants, such as tris(nonylphenyl) phosphite, diphenyl isodecyl phosphite, triphenyl phosphite, tris(2,4-di-tert-butylphenyl)phosphite, and 3,9-bis(2,6-di-tert-butyl-4-methylphenoxy)-2,4,8,10-tetraoxa-3,9-diphosphaspiro[5,5] undecane. Among these, particularly recommended are tetrakis [methylene-3-(3,5-di-tert-butyl-4-hydroxyphenyl) propionate]methane, which is a phenolic antioxidant, and tris(2,4-di-tert-butylphenyl)phosphite and 3,9-bis(2,6-di-tert-butyl-4-methylphenoxy)-2,4,8,10-tetraoxa-3,9-diphosphaspiro[5,5]undecane, which are phosphorous acid ester antioxidants.

The polyolefin resin composition of the present invention can be prepared by adding the crystal nucleating agent composition for polyolefin resins and optionally one or more other additives to a polyolefin resin, and dry-blending the mixture, followed by melting and mixing. Alternatively, the polyolefin resin composition of the present invention can be prepared by adding the compound represented by formula (1), the compound represented by formula (2), and optionally one or more other additives to a polyolefin resin, and dry-blending the mixture, followed by melting and mixing.

The melting and mixing above can be carried out, for example, using a twin-screw extruder at a barrel temperature of 160 to 260° C.

3. Polyolefin Resin Molded Article

The polyolefin resin molded article of the present invention can be obtained by molding the polyolefin resin composition described above in accordance with a conventional molding method. The molding method may be any method as long as the effects of the present invention are obtained. The molding method may be any known molding method, such as injection molding, extrusion molding, blow molding, air-pressure molding, rotational molding, and film molding.

The polyolefin resin molded article thus obtained has a high crystallization temperature and a high crystallization rate. As a result, the molding cycle for the polyolefin resin molded article is remarkably shortened. In particular, the molding cycle for molded articles, such as large components, is remarkably shortened, which is very effective, for example, in reducing costs and preventing problems during processing.

Further, since the polyolefin resin has improved crystallinity, for example, the mechanical performance, such as rigidity, and optical performance, such as transparency, of the resulting molded products are remarkably improved. Therefore, various effects can be achieved, such as weight reduction by making the product thinner, in the fields of automotive materials and industrial materials.

Furthermore, the crystal nucleating agent composition of the present invention can achieve excellent effects even when used in combination with a filler, such as talc, or a neutralizing agent, such as calcium stearate, without reducing the effects, and is thus very useful in various applications.

EXAMPLES

The present invention is described in more detail below with reference to Examples. However, the present invention is not limited to these Examples. The abbreviations of compounds and measurement methods of each property used in the Examples are as follows.

Evaluation Method for Polyolefin Resin Composition (1) Crystallization Temperature The crystallization temperature was measured in accordance with JIS K7121 (1987) using a differential scanning calorimeter (DSC8500, produced by PerkinElmer). About 6 mg each of the polyolefin resin compositions of the Examples and Comparative Examples was used as the evaluation sample. The sample was set on the apparatus, maintained at 200° C. for 3 minutes, and then cooled at a cooling rate of 10° C./min. The top of the endothermic peak was defined as the crystallization temperature (° C.).

(2) Half-Crystallization Time ($T_{1/2}$)

The half-crystallization time was measured in accordance with JIS K7121 (1987) using a differential scanning calorimeter (DSC8500, produced by PerkinElmer). About 6 mg each of the polyolefin resin compositions of the Examples and Comparative Examples was used as the evaluation sample. The sample was set on the apparatus, maintained at 200° C. for 3 minutes, and cooled to 140° C. at a cooling rate of 750° C./min, and isothermal crystallization was performed at this temperature. The time required to reach ½ of the area of the exothermic peak based on the crystallization observed in a relationship diagram between the time and the quantity of heat from the start of the isothermal crystallization was defined as the half-crystallization time ($T_{1/2}$, sec.).

Evaluation Method for Polyolefin Resin Molded Article (3) Cloudiness (Haze Value)

The haze value (%) was measured by a method in accordance with JIS K7136 (2000) using a haze meter (NDH 7000) produced by Nippon Denshoku Industries Co., Ltd. The evaluation sample for use was an olefin resin molded article in the form of a 0.5-mm-thick injection-molded product. The lower the obtained haze value, the better the transparency.

(4) Flexural Modulus

The flexural modulus was measured by a method in accordance with JIS K7171 (2016) using a universal material tester (produced by Instron). The test temperature was 25° C., and the test speed was 10 mm/min.

Compounds Used in the Examples or Comparative Examples

Compound 1: a calcium salt of 4-methylcyclohexanedicarboxylic acid (MH-Ca), a steric structure of a methyl group and two oxycarbonyl groups; cis ratio 95 mol %

Compound 2: a calcium salt of 4-tert-butylcyclohexanedicarboxylic acid (tBuH-Ca), a steric structure of a tert-butyl group and two oxycarbonyl groups; cis ratio 100 mol %

Compound 3: a calcium salt of cyclohexanedicarboxylic acid (HH-Ca)

Compound 4: sodium 2,2'-methylene-bis(4,6-di-tert-butylphenyl)phosphate (product name: ADK STAB NA-11, produced by ADEKA Corporation Example 1

Compound 1 (1 g) and Compound 4 (10 g) were placed in a mixer and uniformly dry-blended at room temperature to prepare a crystal nucleating agent composition.

Next, the total amount (11 g) of the crystal nucleating agent composition obtained above, as well as other additives, which were 5 g of calcium stearate (produced by Nitto Kasei Kogyo K.K.), 5 g of tetrakis [methylene-3-(3,5-di-tert-butyl-4-hydroxyphenyl)propionate]methane (product name: Irganox 1010, produced by BASF Japan Ltd.), and 5 g of tris(2,4-di-tert-butylphenyl)phosphite (product name: Irgafos 168, produced by BASF Japan Ltd.), were added to 10 kg of a polypropylene homopolymer (MER=30 g/10 min (load: 2160 g, temperature: 230° C.)), and the mixture was dry-blended. The obtained dry-blended product was melted and mixed using a twin-screw extruder (produced by Technovel Corporation, L/D=45, screw diameter: 15 mm, die diameter: 5 mm) at a barrel temperature of 200° C. The extruded strand was then cooled and cut with a pelletizer to prepare a polyolefin resin composition. The crystallization temperature and the half-crystallization time of the obtained polyolefin resin composition were measured. Table 1 shows the results.

Subsequently, the obtained polyolefin resin composition was molded under the conditions of an injection molding temperature (heating temperature) of 200° C. and a mold temperature (cooling temperature) of 40° C. using an injection molding machine (NS40-5A, produced by Nissei Plastic Industrial Co., Ltd.) to produce a polyolefin resin molded article of the present invention (test piece). The flexural modulus and the haze value of the obtained test piece were measured. Table 1 shows the results.

Example 2

A crystal nucleating agent composition and a polyolefin resin composition were prepared in the same manner as in Example 1, except that the amount of Compound 1 was changed to 3 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 3

A crystal nucleating agent composition and a polyolefin resin composition were prepared in the same manner as in Example 1, except that the amount of Compound 1 was changed to 5 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 4

A crystal nucleating agent composition and a polyolefin resin composition were prepared in the same manner as in Example 1, except that the amount of Compound 1 was changed to 10 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 5

A crystal nucleating agent composition and a polyolefin resin composition were prepared in the same manner as in Example 4, except that the amount of Compound 4 was changed to 5 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 6

A crystal nucleating agent composition and a polyolefin resin composition were prepared in the same manner as in Example 4, except that the amount of Compound 4 was changed to 3 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 7

A crystal nucleating agent composition and a polyolefin resin composition were prepared in the same manner as in Example 4, except that the amount of Compound 4 was changed to 1 g. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

Example 8

A crystal nucleating agent composition and a polyolefin resin composition were prepared in the same manner as in Example 4, except that Compound 1 was replaced by Compound 2. The crystallization temperature and the half-crystallization time of the obtained polyolefin resin composition were measured. Table 1 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 1 shows the results.

TABLE 1

| Test items | | Unit (conditions) | Example 1 | 2 | 3 | 4 | 5 | 6 | 7 | 8 |
|---|---|---|---|---|---|---|---|---|---|---|
| Crystal nudeating agent composition | Compound represented by formula (1) | | Compound 1 | Compound 1 | Compound 1 | Compound 1 | Compound 1 | Compound 1 | Compound 1 | Compound 2 |
| | Compound represented by formula (2) | | Compound 4 | Compound 4 | Compound 4 | Compound 4 | Compound 4 | Compound 4 | Compound 4 | Compound 4 |
| | Ratio of (1)/(2) (mass ratio) | | 9/91 | 23/77 | 33/67 | 50/50 | 67/33 | 77/23 | 91/9 | 50/50 |
| Crystallization temperature | | ° C. | 134.9 | 135.0 | 135.3 | 136.1 | 135.3 | 1353 | 135.4 | 135.9 |
| Half-crystallization time | | sec | 109 | 100 | 80 | 53 | 65 | 72 | 79 | 59 |
| Haze value | | % | 28 | 28 | 28 | 27 | 29 | 31 | 32 | 27 |
| Flexural modulus | | MPa | 1900 | 1900 | 1920 | 2010 | 1920 | 1910 | 1890 | 2000 |

Comparative Example 1

A crystal nucleating agent composition and a polyolefin resin composition were prepared in the same manner as in Example 1, except that 10 g of Compound 1 was used as the crystal nucleating agent without using the crystal nucleating agent composition of the present invention. The crystallization temperature and the half-crystallization time of the obtained polyolefin resin composition were measured. Table 2 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 2 shows the results.

Comparative Example 2

A crystal nucleating agent composition and a polyolefin resin composition were prepared in the same manner as in Example 1, except that 10 g of Compound 2 was used as the crystal nucleating agent without using the crystal nucleating agent composition of the present invention. The crystallization temperature and the half-crystallization time of the obtained polyolefin resin composition were measured. Table 2 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 2 shows the results.

Comparative Example 3

A crystal nucleating agent composition and a polyolefin resin composition were prepared in the same manner as in Example 4, except that Compound 1 according to the present invention was changed to Compound 3, which is outside the scope of the present invention. The crystallization temperature and the half-crystallization time of the obtained polyolefin resin composition were measured. Table 2 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 2 shows the results.

Comparative Example 4

A crystal nucleating agent composition and a polyolefin resin composition were prepared in the same manner as in Example 1, except that 10 g of Compound 4 was used as the crystal nucleating agent without using the crystal nucleating agent composition of the present invention. The crystallization temperature and the half-crystallization time of the obtained polyolefin resin composition were measured. Table 2 shows the results.

Subsequently, a polyolefin resin molded article of the present invention (test piece) was obtained in the same manner as in Example 1 by using the obtained polyolefin resin composition. The flexural modulus and the haze value of the obtained test piece were measured. Table 2 shows the results.

TABLE 2

| Test items | | Unit | Comparative Example 1 | 2 | 3 | 4 |
|---|---|---|---|---|---|---|
| Crystal nucleating agent composition | Compound represented by formula (1) | | Compound 1 | Compound 2 | Compound 3 | — |
| | Compound represented by formula (2) | | — | — | Compound 4 | Compound 4 |
| | Ratio of (1)/(2) (mass ratio) | | 100/0 | 100/0 | 50/50 | 0/100 |
| Crystallization temperature | | ° C. | 135.6 | 135.7 | 129.1 | 128.0 |
| Half-crystallization time | | sec | 86 | 91 | 137 | 151 |

TABLE 2-continued

| Test items | Unit | Comparative Example 1 | 2 | 3 | 4 |
|---|---|---|---|---|---|
| Haze value | % | 32 | 29 | 28 | 31 |
| Flexural modulus | MPa | 1860 | 1860 | 1690 | 1880 |

A comparison of the results of Examples 5 to 7 in Table 1 and the results of Comparative Example 1 in Table 2 reveals that the addition of a small amount of a nucleating agent that is a metal salt of a phosphoric acid ester to a nucleating agent that is a metal salt of an alicyclic carboxylic acid greatly improved the rigidity while maintaining the excellent crystallization-promoting effect, which is characteristic of the nucleating agent that is a metal salt of an alicyclic dicarboxylic acid.

A comparison of the results of Examples 1 to 3 in Table 1 and the results of Comparative Example 4 in Table 2 reveals that the addition of a small amount of a nucleating agent that is a metal salt of an alicyclic dicarboxylic acid to a nucleating agent that is a metal salt of a phosphoric acid ester greatly improved the crystallization-promoting effect while maintaining the excellent rigidity-improving effect, which is characteristic of the nucleating agent that is a metal salt of a phosphoric acid ester.

A comparison of the results of Example 4 in Table 1 and the results of Comparative Examples 1 and 4 in Table 2, and a comparison of the results of Example 8 in Table 1 and the results of Comparative Examples 2 and 4 in Table 2 reveal that both the crystallization-promoting effect and the rigidity-improving effect were further improved, compared with the case in which each of the crystal nucleating agents was used alone.

A comparison of the results of Examples 4 and 8 in Table 1 and the results of Comparative Example 3 in Table 2 reveal that the use of a calcium salt of 4-methylcyclohexanedicarboxylic acid (MH-Ca) and a calcium salt of 4-tert-butylcyclohexanedicarboxylic acid (t-BuH-Ca) as the nucleating agent that is a metal salt of an alicyclic carboxylic acid greatly improved both the crystallization-promoting effect and the rigidity-improving effect, compared with the case in which a calcium salt of cyclohexanedicarboxylic acid (HH-Ca) was used.

INDUSTRIAL APPLICABILITY

The crystal nucleating agent composition of the present invention when blended with a polyolefin resin can remarkably improve the crystallization rate and crystallization temperature of the polyolefin resin. Further, the crystal nucleating agent composition of the present invention when blended with a polyolefin resin can remarkably improve the rigidity of the resulting molded products. As a result, the molding cycle for polyolefin resin molded articles is remarkably shortened. In particular, the molding cycle for large components etc. is greatly shortened, which is very effective, for example, in reducing costs and preventing problems during processing.

Further, since the polyolefin resin has improved crystallinity, for example, the mechanical performance, such as rigidity, and optical performance, such as transparency, of the resulting molded products are remarkably improved. Therefore, various effects can be achieved, such as weight reduction by making the product thinner, in the fields of automotive materials and industrial materials.

Taking advantage of these characteristics, the crystal nucleating agent composition of the present invention can be widely used not only for automotive materials and industrial materials as described above but also for various applications, such as electrical components, machine parts, daily goods, cases for costumes, and containers for food products.

The invention claimed is:

1. A crystal nucleating agent composition for polyolefin resins, the composition comprising a compound represented by the following formula (1) and a compound represented by the following formula (2):

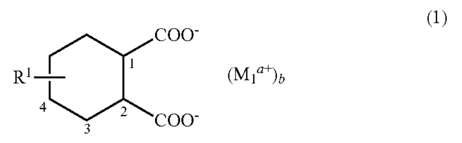

(1)

wherein $R^1$ is a methyl group or a tert-butyl group, $R^1$ binds to the carbon at position 3 or 4 of a cyclohexane ring, and $M_1$ is a calcium ion, a is 2, and b is 1;

and

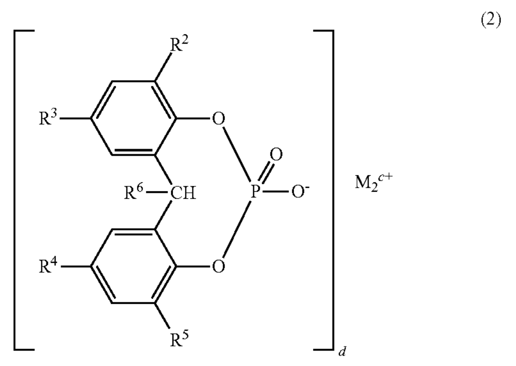

(2)

wherein $R^2$ to $R^5$ each represents a tert-butyl group, $R^6$ is a hydrogen atom, and $M_2$ is a sodium ion c is 1, and dis 1 wherein in the compound represented by formula (1), the content of an isomer in which $R^1$ and two oxycarbonyl groups on the cyclohexane ring all have a cis configuration is 70 mol % or more of total stereoisomers, and wherein the mass ratio of the compound represented by formula (1) to the compound represented by formula (2) is 5/95 to 95/5.

2. The crystal nucleating agent composition for polyolefin resins according to claim 1, wherein in the compound represented by formula (1), the content of an isomer in which $R^1$ and two oxycarbonyl groups on the cyclohexane ring all have a cis configuration is 80 mol % or more of total stereoisomers.

3. A polyolefin resin composition comprising the crystal nucleating agent composition for polyolefin resins of claim 1 and a polyolefin resin.

4. A polyolefin resin composition according to claim 2, comprising the crystal nucleating agent composition for polyolefin resins in an amount of 0.001 to 10 parts by mass per 100 parts by mass of the polyolefin resin.

5. A polyolefin resin molded article comprising the polyolefin resin composition of claim 2.

6. A method for producing the crystal nucleating agent composition for polyolefin resins of claim 1, the method comprising mixing the compound represented by formula (1) and the compound represented by formula (2).

7. A method for producing the polyolefin resin composition of claim 2, the method comprising mixing the compound represented by formula (1) and the compound represented by formula (2) to obtain a crystal nucleating agent composition for polyolefin resins, and blending the obtained crystal nucleating agent composition with a polyolefin resin.

8. A polyolefin resin composition comprising the crystal nucleating agent composition for polyolefin resins of claim 1 and a polyolefin resin.

9. A method for producing the crystal nucleating agent composition for polyolefin resins of claim 1, the method comprising mixing the compound represented by formula (1) and the compound represented by formula (2).

10. A method for producing the polyolefin resin composition of claim 1, the method comprising mixing the compound represented by formula (1) and the compound represented by formula (2) to obtain a crystal nucleating agent composition for polyolefin resins, and blending the obtained crystal nucleating agent composition with a polyolefin resin.

* * * * *